(12) United States Patent
Makinen et al.

(10) Patent No.: US 7,552,818 B2
(45) Date of Patent: Jun. 30, 2009

(54) SUPPORT MEANS

(75) Inventors: Marko Kalevi Makinen, Tampere (FI);
Stephen Alexander Whyte, Omagh (GB); Kari Heikki Olavi Antila, Tampere (FI)

(73) Assignee: Metso Minerals (Cappagh) Ltd. (GB)

( * ) Notice: Subject to any disclaimer, the term of this patent is extended or adjusted under 35 U.S.C. 154(b) by 273 days.

(21) Appl. No.: 10/555,152

(22) PCT Filed: Apr. 30, 2004

(86) PCT No.: PCT/GB2004/001922

§ 371 (c)(1),
(2), (4) Date: Dec. 18, 2006

(87) PCT Pub. No.: WO2004/096677

PCT Pub. Date: Nov. 11, 2004

(65) Prior Publication Data

US 2007/0158162 A1     Jul. 12, 2007

(30) Foreign Application Priority Data

May 2, 2003     (GB) ................................ 0310177.1

(51) Int. Cl.
B65G 21/00     (2006.01)
(52) U.S. Cl. .................... 198/861.2; 198/861.4
(58) Field of Classification Search .............. 198/861.1, 198/861.2, 861.4
See application file for complete search history.

(56) References Cited

U.S. PATENT DOCUMENTS 3,684,255 A     8/1972     Rossi ......................... 259/169

(Continued)

FOREIGN PATENT DOCUMENTS

EP     0 641 607 B1     12/1998

OTHER PUBLICATIONS

PCT International Search Report for International Application No. PCT/GB2004/001922, filed Apr. 30, 2004, mailed Sep. 21, 2004 (6 pages).

*Primary Examiner*—Douglas A Hess
(74) *Attorney, Agent, or Firm*—Victor A. Cardona; Heslin Rothenberg Farley & Mesiti P.C.

(57) ABSTRACT

The invention relates to support means, which is for supporting a lateral conveyor adapted for mounting upon a mobile chassis, including a tail section, middle section and at least one head section having pivot points related to the conveyor frame separating said sections from each other. The support means includes a variable length mounting arm comprising at least first and second sections and first and second ends, and means for locking the length of the mounting arm into at least one fixed length corresponding to the length of the conveyor in use. The first end is fixed immobile in relation to the mobile chassis and the second end is fixed immobile in relation to the head section of the conveyor. Also, the support means is configured to provide at least three kinematic pairs, a first kinematic pair being formed by the first section and the mobile chassis, a second kinematic pair is formed by the first and second sections, and the third kinematic pair is formed by the second section and the head section of the conveyor and is provided by a joint, the support means being further configured such that the first, second and third kinematic pairs respectively provide for two, one and three degrees of freedom of movement.

40 Claims, 7 Drawing Sheets

U.S. PATENT DOCUMENTS

| | | | |
|---|---|---|---|
| 3,768,784 A * | 10/1973 | Spellman, Jr. | 366/49 |
| 4,579,479 A * | 4/1986 | Bryant | 404/128 |
| 4,648,776 A * | 3/1987 | Hradil et al. | 414/565 |
| 4,749,326 A * | 6/1988 | Crawshay et al. | 414/565 |
| 4,780,041 A * | 10/1988 | Ashby, Jr. | 414/398 |
| 5,123,519 A * | 6/1992 | Reninger et al. | 198/508 |
| 5,184,715 A * | 2/1993 | Feterl | 198/667 |
| 5,333,725 A * | 8/1994 | Douglas | 198/632 |
| 5,348,130 A * | 9/1994 | Thomas | 198/312 |
| 5,562,194 A * | 10/1996 | Wusten | 198/309 |
| 5,779,321 A * | 7/1998 | Coleman et al. | 299/64 |
| 6,296,109 B1 * | 10/2001 | Nohl | 198/632 |
| 6,698,594 B2 * | 3/2004 | Cohen et al. | 209/421 |
| 7,191,889 B1 * | 3/2007 | Heley | 198/315 |
| 7,261,200 B1 * | 8/2007 | Kemper | 198/632 |
| 7,273,150 B2 * | 9/2007 | Fridman et al. | 209/241 |

* cited by examiner

SUPPORT MEANS

CROSS REFERENCE TO RELATED APPLICATIONS

This is the national stage of PCT International application no. PCT/GB2004/001922 filed Apr. 30, 2004 and published in English as WO 2004/096677 A1 on Nov. 11, 2004 which claims the priority of United Kingdom application no. 0310177.1, filed May 2, 2003, the disclosures of which are hereby incorporated herein by reference.

FIELD OF THE INVENTION

This invention relates to improvements in support means for supporting a lateral conveyor particularly adapted for mounting on a mobile, aggregate material processing plant such as screening plant, crushing plant or mining plant, and, more particularly, to improvements in the support arms for supporting a stowable lateral conveyor upon the plant.

BACKGROUND OF THE INVENTION

In this specification, the term "aggregate material" means different types of mined or quarried or natural mineral materials, like gravel, sand, ores, coal, different kinds of soil materials like loam and peat, different kinds of construction waste materials like concrete, bricks and asphalt as well as organic materials like timber wood chips, etc.

In this specification, the term "processing" of aggregate materials means feeding, shredding, crushing, screening, separating, washing and conveying of aggregate materials.

In aggregate material processing plant generally, processing capacity is heavily influenced by the ability to quickly and effectively deliver the processed material away from the plant. To achieve this, it is known to provide lateral conveyors which extend transversely of the plant, possibly in addition to longitudinal conveyors. While the manner in which the lateral conveyors are connected to the plant is relatively simple for the operating position, major problems arise in ensuring that the overall width and height of the mobile plant is within certain dimensions when carrying such conveyors during transport. Another problem is ensuring safety, on-site, in movement of the lateral conveyors to a position for transport of the mobile plant. A further problem lies in the support of the lateral conveyors during operation and when travelling inside the worksite with the conveyors in the working position: the conveyors are subject to high stresses due to their own weight, the weight of the screened material on the belt and vibrations caused by uneven and/or soft soil at the worksite. A still further problem is that of providing for easy and safe maintenance or repair of the lateral conveyors on-site or at a workshop.

EP 0641 607B describes a known mobile aggregate material processing plant comprising a chassis having a pair of longitudinal beams mounted on wheels and supported on jack legs.

The plant is provided with two lateral conveyors each of which comprises a tail section a middle section and a head section. The head section delivers processed material to form a stockpile of material. The conveyors are folded from the working position to the transport position by a pair of hydraulic rams. In the working position the conveyor is supported on the chassis by a support extending between the middle section and the tail section of the conveyor, the tail section being fixed to the chassis of the mobile plant. The head section of the conveyor is left unsupported.

The amount of material which can be processed by the plant is determined in part by the length of the lateral conveyors. The longer the conveyors are the higher and bigger in volume the stockpiles can be and the less you have to reserve resources for transferring the material away from the machine's stockpiles. In some instances, only one feeding machine; e.g. a wheel loader, is used for both feeding the machine and removing the processed material from the stockpiles. The bigger the stockpiles are the more freedom for planning the feeding/removing work and the less unplanned breaks have to be included in the job.

The dimensions of the conveyors in the transport position are limited by the permissible transport dimensions of the machine, as regulated in the road transport regulations. Neither the conveyors nor their supports, nor any other part of the plant is allowed to exceed these dimensions. If, for example, the chassis is dimensioned to be exactly within the permissible transport width, then the conveyors and their supports must not project laterally beyond the chassis.

EP 0641 607B provides a good solution for folding the lateral conveyors from a working position to transport position making it possible firstly to fold the middle section around the first axis being substantially parallel to the longitudinal axis of the chassis of the plant and secondly to fold the head section around the second axis substantially parallel to the lateral axis of the chassis of the plant, and back. So far, it has been a problem, to easily and effectively support such foldable conveyors.

In EP 0641 607B the path of the head section of the conveyor from the working position to the transport position is relatively complicated. So far it has not been possible to provide foldable support beams for the head section, which is easy to use and does not challenge the permissible transport dimensions of the plant. The manufacturers have had to settle with a foldable support beam extending between the middle section and the tail section of the conveyor, as the path of middle section from the working position to the transport position is much simpler than that of the head section. Anyhow, this sort of support leaves the head section unsupported, which makes the conveyors subject to high stresses due to their own weight, the weight of the screened material on the belt and vibrations caused by uneven and/or soft soil at the worksite while working or travelling inside the worksite with the conveyors in the working position.

Manufacturers and users of such plants have tried to solve the problem by extending the length of the middle section of the conveyor to provide a better support with foldable support beams. However, this would challenge the transportation height of the plant. Also detachable, non-foldable, supports between the conveyor's head section and the plant chassis and/or the ground have been used: these have proved to be difficult to use or even dangerous in situations where the support has detached itself accidentally.

A still further problem is that of providing for easy and safe maintenance or repair of the lateral conveyors on-site or at a workshop. Head sections often include some parts requiring maintenance, like motor, bearings, belt scraper, safeguarding etc. A safe way of reaching these parts has proved illusive as they are quite high and ground in the worksite is usually soft or uneven, which makes it dangerous to work using ladders. More safe equipment helping the service people to reach high is not often available in the worksites.

It is an object of the present invention to provide a mobile aggregate processing plant which can support lateral conveyors of a greater length than is currently possible with known plant, such as described above in relation to EP 0641607B.

Additionally, it is a further object of the present invention to provide a safe and easy to use support means for a lateral conveyor of an aggregate processing plant which allows the lateral conveyor to be stowed in a transit position within permissible dimensions.

Further, it is an added object of the present invention to provide a support means for a lateral conveyor or an aggregate processing plant which allows the head section of the lateral conveyor to be accessed from the ground for easy maintenance and repair thereof.

SUMMARY OF THE INVENTION

According to a first aspect of the present invention, there is provided a support means for supporting a lateral conveyor adapted for mounting upon a mobile chassis, said conveyor comprising of tail section, middle section and at least one head section having pivot points related to the conveyor frame separating said sections from each other, said support means comprising a variable length mounting arm, said mounting arm comprising at least two sections and first and second ends, means for locking the length of the mounting arm into at least one fixed length corresponding to the length of the conveyor in the working position, the first end being fixed to said mobile chassis or a part fixed immobile in relation to said mobile chassis and the second end being fixed to the said head section of the conveyor or a part fixed immobile in relation to the said head section of the conveyor, the support means being configured to provide at least three kinematic pairs, in which a first kinematic pair is formed by the first section of the mounting arm and the mobile chassis, a second kinematic pair is formed by the first and second sections of the mounting arm, and the third kinematic pair is formed by the second section of the mounting arm and the head section of the conveyor and is provided by a joint, the support means being further configured such that the first kinematic pair provides for two degrees of freedom of movement, the second kinematic pair provides for one, degree of freedom of movement, and the third kinematic pair provides for three degrees of freedom of movement.

More specifically, the support means may be configured such that both the first and third kinematic pairs provide for three degrees of freedom of movement.

Alternatively or in addition, the two degrees of freedom of movement of the first kinematic pair may be provided by a further joint between the first section of the mounting arm and the mobile chassis.

More specifically, the further joint may comprise a pivot mounting shaft and a swivel mounting shaft, whereby the mounting arm may be elevated in a one plane by pivoting upon the pivot mounting shaft and traversed in another plane by swivelling on the swivel mounting shaft.

Alternatively or in addition, the degree of freedom of movement of the second kinematic pair may be provided by configuring the first and second sections for sliding in relation to each other.

Alternatively or in addition, the degree of freedom of movement of the second kinematic pair may be provided by configuring the first and second sections for substantially linear movement in relation to each other.

More specifically, the second section may move substantially in a direction of its longitudinal axis.

Alternatively or in addition, the three degrees of freedom of movement of the third kinematic pair may be provided by the joint comprising a pivot mounting shaft, a swivel mounting shaft, and a rotational mounting shaft, whereby the mounting arm may be elevated in a first plane by pivoting upon the pivot mounting shaft and traversed in a second plane by swivelling on the swivel mounting shaft, and rotated about its longitudinal axis on the rotational mounting shaft.

More specifically, the first and second planes may be perpendicular.

More specifically, the longitudinal axis of the second section may be substantially parallel to a line of intersection of said planes.

Alternatively or in addition, one of the first and second sections may be located within the other to allow for telescopic length adjustment of the mounting arm.

More specifically, the mounting arm may comprise a hydraulic cylinder.

Alternatively or in addition, the mounting arm may comprise three sections, in which the degree of freedom of movement of the second kinematic pair is provided between at least a first and second section and between the second and a third section.

Alternatively or in addition, the support means may further comprise means for locking the length of the variable length mounting arm into a fixed length corresponding to the length of the conveyor in the transport position and/or service position.

Alternatively or in addition, the head section of the conveyor may consist of at least two separate sections pivotable to each other, the first of the said head sections being supported to said mobile chassis or a part fixed immobile in relation to said mobile chassis with said variable length arm.

Alternatively or in addition, one end of the mounting arm may be connected to a tail section of the conveyor and the other end of the mounting arm may be connected to a head section of the conveyor.

Alternatively or in addition, a collar and a locking pin may be provided to fix the length of the support to correspond to the working position of the conveyor, preferably also to the transport position and to the maintenance position.

By enabling the support means to move in this manner, greater flexibility of positioning and movement of the support means may be available and therefore the length of the support means can be extended in comparison to prior art plant whilst still allowing the support means to lie within the permissible dimensions of the plant when the conveyor is in a transit position. Furthermore, as the length of the support means can be increased from the known plant, the length of the conveyor itself can be increased thereby allowing for a higher stockpile and higher capacity of the plant.

Alternatively or in addition, the mounting arm may comprise a box section which may be formed of metal or any suitable material. The box section may be extruded or may be cast or may be cut from hollow or even open section in the required lengths.

Alternatively or in addition, the support means may be formed of mild steel.

In a form of the aspect of the invention, a C-shaped bracket comprising a top face, a bottom face and a back plate extending between the top and bottom plates may be mounted on at least one end of the mounting arm, through the rotational mounting shaft.

More specifically, the top and bottom faces of the C-shaped bracket may be substantially parallel and the back plate may extend substantially perpendicularly to the top and bottom faces.

Alternatively or in addition, bearing means may be provided between the end face of the mounting arm and the back plate of the bracket.

Alternatively or in addition, bearing means may be provided between all gliding surfaces.

Alternatively or in addition, an aperture may be provided in each of the top and bottom faces of the C-shaped bracket, said apertures being aligned along a common axis through the bracket.

Alternatively or in addition, the swivel mounting shaft may be provided with a through bore and said swivel mounting shaft may be mounted within the C-shaped bracket such that the bore is aligned with the apertures in the top and bottom face of the bracket.

Alternatively or in addition, the pivot mounting shaft may extend though the apertures in the top and bottom faces of the C-shaped bracket and the bore of the swivel mounting shaft to lock the swivel mounting shaft in position within the bracket.

Fine adjustment of the length of the mounting arm may provide for adjustment of tracking of a conveyor belt carried upon the lateral conveyor. Such tracking adjustment can be carried out from ground level whilst the conveyor is operating thereby avoiding downtime of the plant and subsequent loss of production.

Alternatively or in addition, the present aspect of the invention may comprise one or more features of one or more of the other aspects of the present invention.

According to a second aspect of the present invention, there is provided a support means for supporting a lateral conveyor adapted for mounting upon a mobile chassis, said conveyor comprising of tail section, middle section and at least one head section having pivot points related to the conveyor frame separating said sections from each other, said support means comprising a variable length mounting arm, said mounting arm comprising at least two sections and first and second ends, means for locking the length of the mounting arm into at least one fixed length corresponding to the length of the conveyor in the working position, the first end being fixed to said mobile chassis or a part fixed immobile in relation to said mobile chassis and the second end being fixed to the said head section of the conveyor or a part fixed immobile in relation to the said head section of the conveyor, the support means being configured to provide at least three kinematic pairs, in which a first kinematic pair is formed by the first section of the mounting arm and the mobile chassis and is provided by a joint, a second kinematic pair is formed by the first and second sections of the mounting arm, and the third kinematic pair is formed by the second section of the mounting arm and the head section of the conveyor, the support means being configured such that the first kinematic pair provides for three degrees of freedom of movement, the second kinematic pair provides for one degree of freedom of movement, and the third kinematic pair provides for two degrees of freedom of movement.

More specifically, the third kinematic pair may be provided by a further joint between the second section of the mounting arm and the head section of the conveyor.

Alternatively or in addition, the further joint may comprise a pivot mounting shaft and a swivel mounting shaft, whereby the mounting arm may be elevated in a one plane by pivoting upon the pivot mounting shaft and traversed in another plane by swivelling on the swivel mounting shaft.

Alternatively or in addition, the three degrees of freedom of movement of the first kinematic pair may be provided by the joint comprising a pivot mounting shaft, a swivel mounting shaft, and a rotational mounting shaft, whereby the mounting arm may be elevated in a first plane by pivoting upon the pivot mounting shaft and traversed in a second plane by swivelling on the swivel mounting shaft, and rotated about its longitudinal axis on the rotational mounting shaft.

The second aspect of the present invention may comprise one or more features described above with reference to the first aspect of the present invention.

According to a third aspect of the present invention, there is provided a support means for supporting a lateral conveyor adapted for mounting upon a mobile chassis, said conveyor comprising of tail section, middle section and at least one head section having pivot points related to the conveyor frame separating said sections from each other, said support means comprising a variable length mounting arm, said mounting arm comprising at least two sections and first and second ends, means for locking the length of the mounting arm into at least one fixed length corresponding to the length of the conveyor in the working position, the first end being fixed to said mobile chassis or a part fixed immobile in relation to said mobile chassis and the second end being fixed to the said head section of the conveyor or a part fixed immobile in relation to the said head section of the conveyor, the support means being configured to provide at least three kinematic pairs, in which a first kinematic pair is formed by the first section of the mounting arm and the mobile chassis, a second kinematic pair is formed by the first and second sections of the mounting arm, and the third kinematic pair is formed by the second section of the mounting arm and the head section of the conveyor and is provided by a joint, the support means being further configured such that the first kinematic pair provides for two degrees of freedom of movement, the second kinematic pair provides for two degrees of freedom movement, and the third kinematic pair provides for two degrees of freedom of movement.

More specifically, the two degrees of freedom of movement of the first kinematic pair may be provided by a further joint between the first section of the mounting arm and the mobile chassis.

More specifically, the further joint may comprise a pivot mounting shaft and a swivel mounting shaft, whereby the mounting arm may be elevated in a one plane by pivoting upon the pivot mounting shaft and traversed in another plane by swivelling on the swivel mounting shaft.

Alternatively or in addition, the two degrees of freedom of movement of the second kinematic pair may be provided by configuring the first and second sections for rotation and sliding in relation to each other.

More specifically, the second section may be rotated about its longitudinal axis and moved substantially in a direction of its longitudinal axis.

Alternatively or in addition, the two degrees of freedom of movement of the third kinematic pair may be provided by the joint comprising a pivot mounting shaft and a swivel mounting shaft, whereby the mounting arm may be elevated in a first plane by pivoting upon the pivot mounting shaft and traversed in a second plane by swivelling on the swivel mounting shaft.

More specifically, the first and second planes may be perpendicular.

More specifically, the longitudinal axis of the second section may be substantially parallel to a line of intersection of said planes.

Alternatively or in addition, one of the first and second sections may be located within the other to allow for telescopic length adjustment of the mounting arm.

More specifically, the mounting arm may comprise a hydraulic cylinder.

Alternatively or in addition, co-located portions of the first and second sections may be of substantially circular cross-section.

Alternatively or in addition, the mounting arm may comprise three sections, in which a first degree of freedom of movement is provided between a first and second section and a second degree of freedom of movement is provided between the second and a third section.

More specifically, the mounting arm may be configured such that the first degree of freedom of movement is sliding of the first and second sections in relation to each other and the second degree of freedom of movement is rotation of the second and third sections in relation to each other.

Alternatively, the mounting arm may be configured such that the first degree of freedom of movement is rotation of the first and second sections in relation to each other and the second degree of freedom of movement is sliding of the second and third sections in relation to each other.

More specifically, the support means may be configured such that at least one of the first and third kinematic pairs provides for three degrees of freedom of movement.

Alternatively or in addition, the third aspect of the invention may comprise one or more features of the first aspect of the present invention.

According to a fourth aspect of the present invention there is provided a mobile chassis comprising a lateral conveyor mounted thereon and a support means for supporting a lateral conveyor according to any one of the first to third aspects of the present invention.

More specifically, said mobile chassis is a mobile aggregate processing plant. The chassis may be, for example, wheel- or track-mounted.

According to a fifth aspect of the present invention, there is provided a support means for supporting a lateral conveyor adapted for mounting upon a mobile chassis, said conveyor comprising of tail section, middle section and at least one head section having pivot points related to the conveyor frame separating said sections from each other, said supporting means comprising a variable length mounting arm, said mounting arm comprising a first end and a second end, means for locking the length of the variable length mounting arm into at least one fixed length corresponding to the length of the conveyor in the working position, one end being fixed to said mobile chassis or a part fixed immobile in relation to said mobile chassis, said other end of the mounting arm being fixed to the said head section of the conveyor or a part fixed immobile in relation to the said head section of the conveyor via a joint allowing three degrees of freedom of movement of the mounting arm with respect to the head section of the conveyor.

More specifically, said one end of the mounting arm may be connected to said mobile chassis or a part fixed immobile in relation to said mobile chassis with a joint allowing at least two degrees of freedom of movement.

Alternatively or in addition, the support means may further comprise means for locking the length of the variable length mounting arm into fixed length corresponding to the length of the conveyor in the transport position and/or service position.

Alternatively or in addition, the head section of the conveyor may consist of at least two separate sections pivotable to each other, the first of the said head sections being supported to said mobile chassis or a part fixed immobile in relation to said mobile chassis with said variable length arm.

Alternatively or in addition, said joint having three degrees of freedom of movement may comprise a pivot mounting shaft, a swivel mounting shaft, and a rotational mounting shaft, whereby the mounting arm may be elevated in a first plane by pivoting upon the pivot mounting shaft, and traversed in a second plane by swivelling on the swivel mounting shaft, and rotated about its longitudinal axis on the rotational mounting shaft.

Preferably, the mounting arm may be formed of two sections, one being located within the other to allow for telescopic length adjustment of the mounting arm. Advantageously, one end of the mounting arm may be connected to a tail section of the conveyor and the other end of the mounting arm may be connected to a head section of the conveyor.

The fifth aspect of the invention may comprise one or more features of any one of the first to fourth aspects of the invention.

According to a sixth aspect of the present invention, there is provided a support means for supporting a lateral conveyor adapted for mounting upon a mobile chassis, said conveyor comprising of tail section, middle section and at least one head section having pivot points related to the conveyor frame separating said sections from each other, said support means comprising a variable length mounting arm, said mounting arm comprising a first end and a second end, means for locking the length of the variable length mounting arm into at least one fixed length corresponding to the length of the conveyor in the working position, one end being fixed to said mobile chassis or a part fixed immobile in relation to said mobile chassis, said other end of the mounting arm is fixed to the said head section of the conveyor or a part fixed immobile in relation to the said head section of the conveyor via a joint allowing first and second degrees of freedom of movement of the mounting arm with respect to the head section of the conveyor, the mounting arm comprising a first section towards the mobile chassis and a second section towards the head section, the first and second sections being configured for their relative movement to provide a third degree of freedom of movement of the first section of the mounting arm with respect to the head section of the conveyor.

More specifically, the third degree of freedom of movement may be provided by configuring the first and second sections for rotation in relation to each other, whereby the second section may be rotated about its longitudinal axis.

Alternatively or in addition, the joint having two degrees of freedom of movement may comprise a pivot mounting shaft and a swivel mounting shaft, whereby the mounting arm may be elevated in a first plane by pivoting upon the pivot mounting shaft and traversed in a second plane by swivelling on the swivel mounting shaft.

Alternatively or in addition, the first and second sections may be further configured for their relative movement to provide a fourth degree of freedom of movement of the first section of the mounting arm with respect to the head section of the conveyor.

More specifically, the fourth degree of freedom of movement may be provided by configuring the first and second sections for sliding movement in relation to each other.

More specifically, one of the first and second sections may be located within the other to allow for telescopic length adjustment of the mounting arm.

More specifically, co-located portions of the first and second sections may be of substantially circular cross-section.

Alternatively or in addition, the sixth aspect of the invention may comprise one or more features of any of the other aspects of the invention.

According to a seventh aspect of the present invention, there is provided a support means for supporting a lateral conveyor adapted for mounting upon a mobile chassis, said conveyor comprising of tail section, middle section and at least one head section having pivot points related to the conveyor frame separating said sections from each other, said supporting means comprising a variable length mounting arm, said mounting arm comprising a first end and a second end, means for locking the length of the variable length mounting arm into at least one fixed length corresponding to the length of the conveyor in the working position, one end being fixed to the said head section of the conveyor or a part fixed immobile in relation to the said head section of the conveyor, said other end of the mounting arm being fixed to said mobile chassis or a part fixed immobile in relation to said mobile chassis via a joint allowing three degrees of freedom of movement of the mounting arm with respect to the head section of the conveyor.

The seventh aspect of the invention may comprise one or more features of any of the other aspects of the invention.

According to an eighth aspect of the present invention there is provided a support means for supporting a lateral conveyor adapted for mounting upon a mobile chassis, said conveyor comprising of tail section, middle section and at least one head section having pivot points related to the conveyor frame separating said sections from each other; said supporting means comprising a variable length mounting arm said mounting arm comprising a first end and a second end means for locking the length of the variable length mounting arm into at least one fixed length corresponding to the length of the conveyor in the working position one end being fixed to said mobile chassis or a part fixed immobile in relation to said mobile chassis characterised in that said other end of the mounting arm is fixed to the said head section of the conveyor or a part fixed immobile in relation to the said head section of the conveyor and adjustment means are provided to finely alter the length of the mounting arm when locked into the at least one fixed length.

The eighth aspect of the present invention may comprise one or more features of any of the other aspects of the invention.

Embodiments of the present invention will now be described with reference to and as shown in the accompanying drawings in which.

MODES FOR CARRYING OUT THE INVENTION

Figure 1:
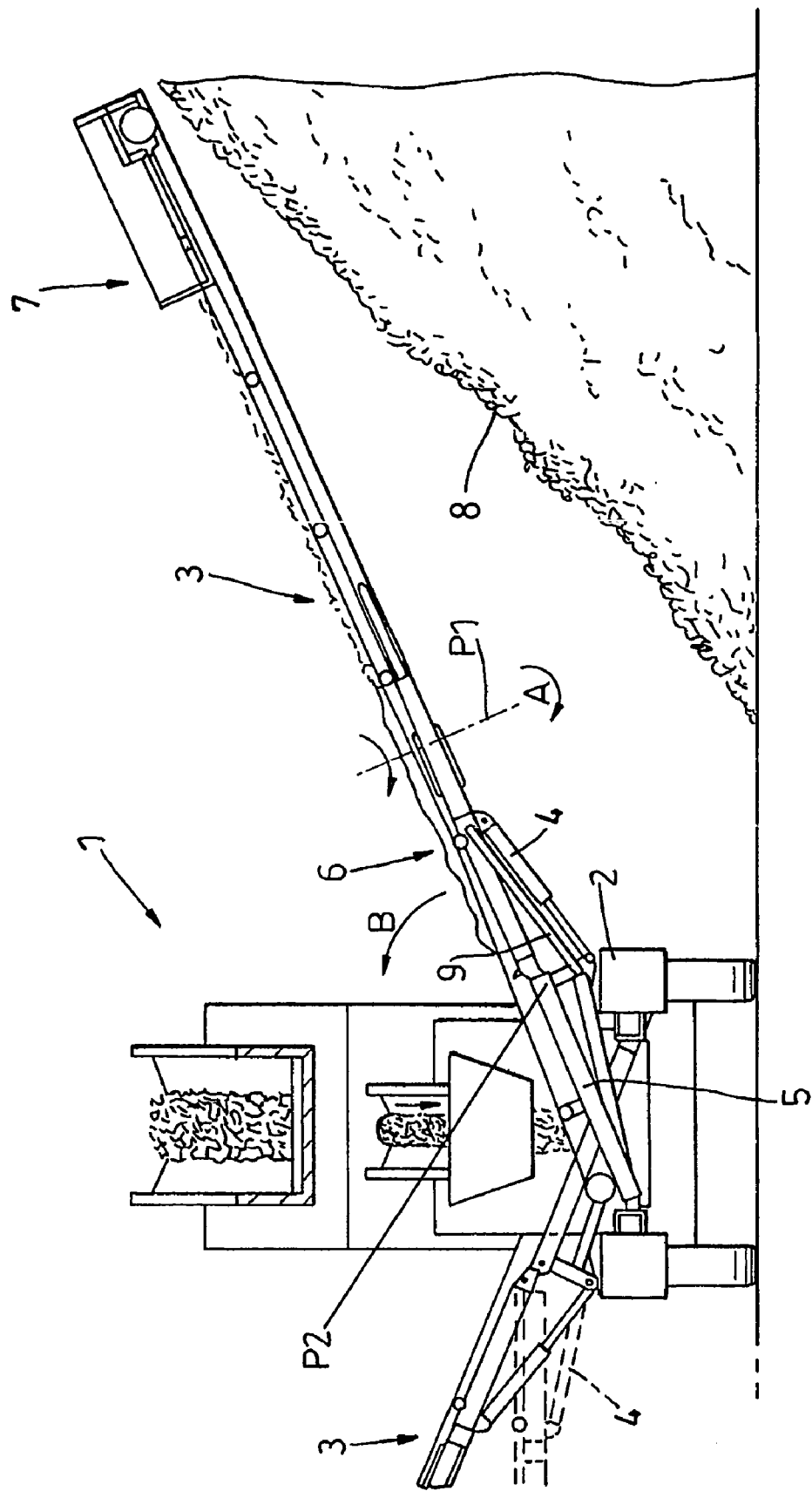
FIG. 1 is a schematic view of a known processing plant according to the prior art which illustrates a known support means for a lateral conveyor mounted on the chassis of the plant.

Turning now to the Figures, there is shown in FIG. 1 a known mobile aggregate processing plant 1 which comprises a chassis 2 upon which a pair of lateral conveyors 3 are mounted. The plant comprises a screen (not shown) which distributes the screened material on to the lateral conveyors 3. The plant is shown in FIG. 1 in an end elevation in order to clearly show the lateral conveyors 3 which are mounted on either side of the chassis 2 of the plant.

Hydraulic rams 4 are operated to extend the conveyors from a stowed position adjacent the chassis for transport to the operating position shown in FIG. 1. The lateral conveyors comprise a tail section 5 adjacent to the chassis 2, a middle section 6 and a head section 7 remote from the chassis 2. The head section of the conveyor is mounted to the middle section through a pivot point P1 such that the head section can pivot around the pivot point as shown by axis A in FIG. 1. Processed material passes along the lateral conveyors from the tail section to the head section and exits the head section to form a stock pile 8 under the head section. The middle section of the conveyor is supported against the tail section of the conveyor, which is immobile in relation to the chassis The middle section is pivotally connected to the tail section through pivot point P2 such that the middle section can be folded towards the chassis 2 in the direction of Arrow B.

The lateral conveyors are supported on the chassis of the plant by support means 9 (only one of which is shown in FIG. 1 for clarity) which are mounted to the tail section and middle section of the conveyor respectively. The tail section of the conveyor is, in turn, firmly mounted to the chassis.

Figure 2:
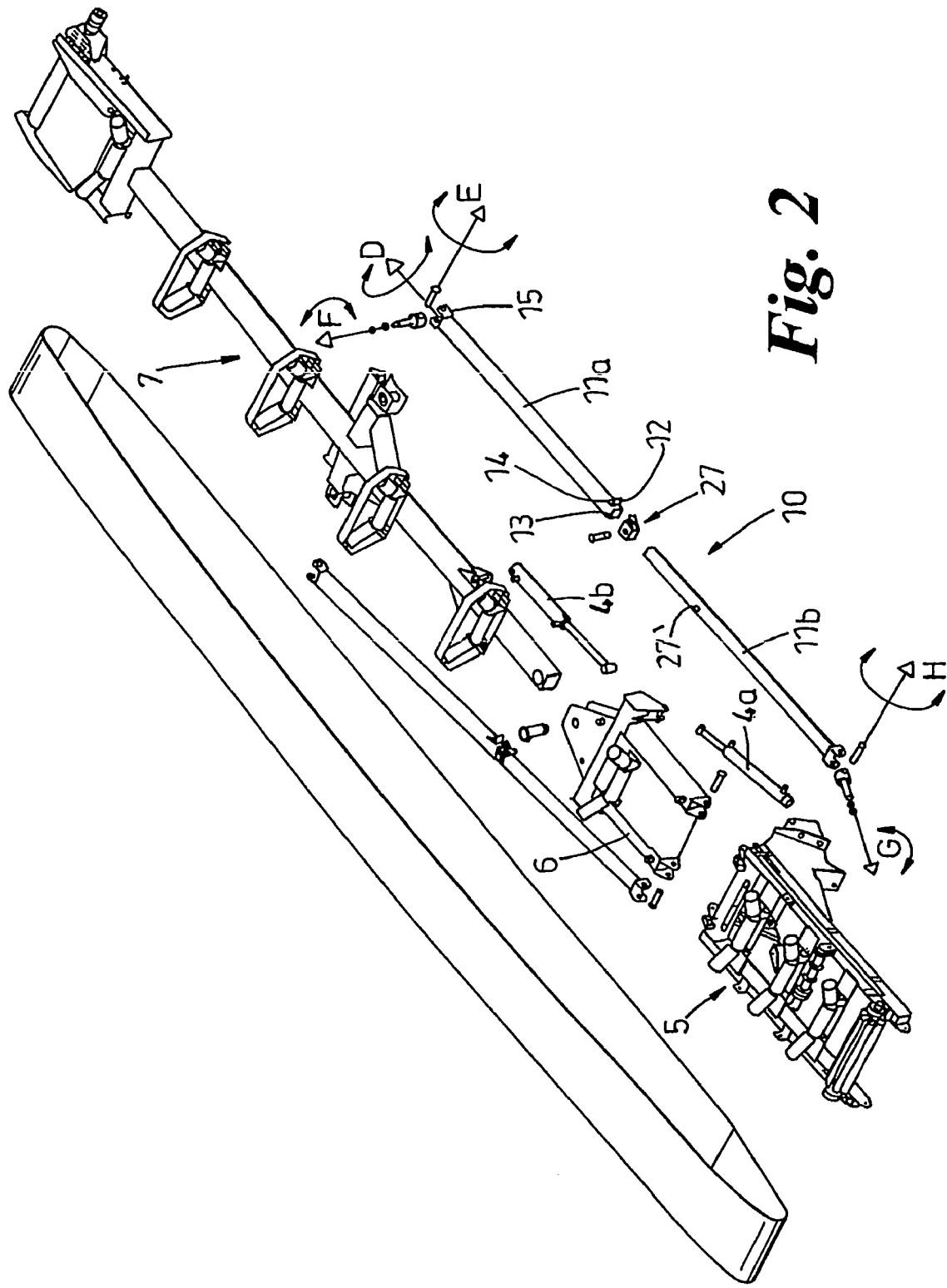
FIG. 2 is an exploded view of a lateral conveyor including a support means according to an embodiment of the present invention.

FIG. 2 shows an exploded view of a lateral conveyor of the type described above in relation to the prior art but with a support means according to one aspect of the present invention. The support means 10 for the lateral conveyors of the present invention is in the form of a mounting arm 11a, 11b formed of a box section of mild steel. This may be extruded or cast to the appropriate lengths as required or may be a hollow section if preferred. A lateral flange 12 is provided adjacent one end 13 of the mounting arm 11a. Triangular support brackets 14 are formed under the flange 12 between the underside of the flange and the mounting arm 11a.

Figure 3:
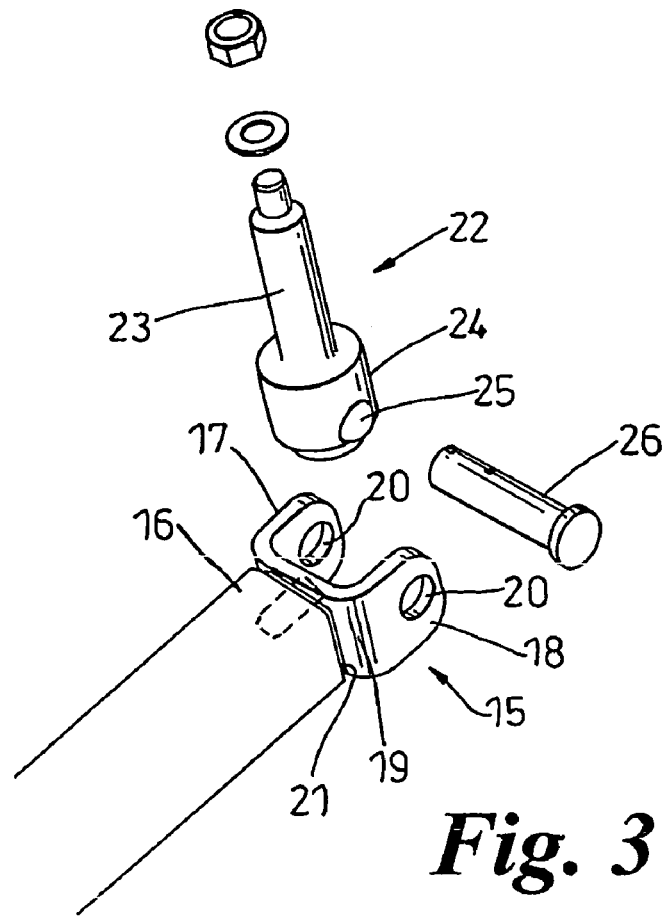
FIG. 3 is an enlarged schematic side view of one end of the section of the mounting arm shown in FIG. 2.

The other end of the mounting arm, remote from the flange 12 is mounted to a C-shaped bracket 15 through a rotational mounting shaft 16 shown in more detail in FIG. 3. This allows the mounting arm 11a to rotate around axis D shown in FIG. 2 with respect to the bracket 15. The C-shaped bracket has a substantially flat top face 17 and a substantially flat bottom face 18 and a back plate 19 extending between the two. The top face and bottom face of the bracket are provided with apertures 20 which are aligned on a common axis of the bracket.

The rotational mounting shaft 16 passes through corresponding aperture (not shown) in the back plate 19 of the bracket and the end face 21 of the mounting arm such that the mounting arm can rotate around its longitudinal axis upon the rotational mounting shaft. A bearing (not shown) may be provided between the end face 21 of the mounting arm and the back plate 19 of the bracket in order to facilitate rotation of the mounting arm.

The means for attaching the mounting arm 11a to the conveyor is shown in detail in FIG. 3. This shows the end of the mounting arm 11a with the C-shaped bracket 15 attached thereto. A swivel mounting shaft 22 is provided to facilitate traversing of the mounting means around axis F in FIG. 2 and comprising a cylindrical shaft member 23 which is attached to the conveyor's head section at one end and is provided with a head section 24 at the distal end, the head section having a greater diameter than the shaft.

The head section 24 of the cylindrical shaft member is dimensioned to be mounted between the top and bottom faces 17, 18 of the C-shaped bracket 15 and is provided with a through bore 25 which is aligned with the apertures 20 in the top and bottom faces of the bracket when the head section 24 is presented to the bracket.

A pivot mounting shaft 26 extends through the apertures 20 and the through bore 25 to retain the head section 24 of the swivel mounting means within the bracket 15. The pivot mounting shaft 26 facilitates elevation of the mounting arm 11a around axis E shown in FIG. 2 by allowing the bracket 15 to pivot around the shaft 26. Bearings (not shown) may be provided between the head section 24 of the swivel mounting shaft 22 and the top and bottom faces 17, 18 of the bracket.

The articulated joint between the head section 7 and the mounting arm 11a, as described above, provides three degrees of freedom.

Figure 4:
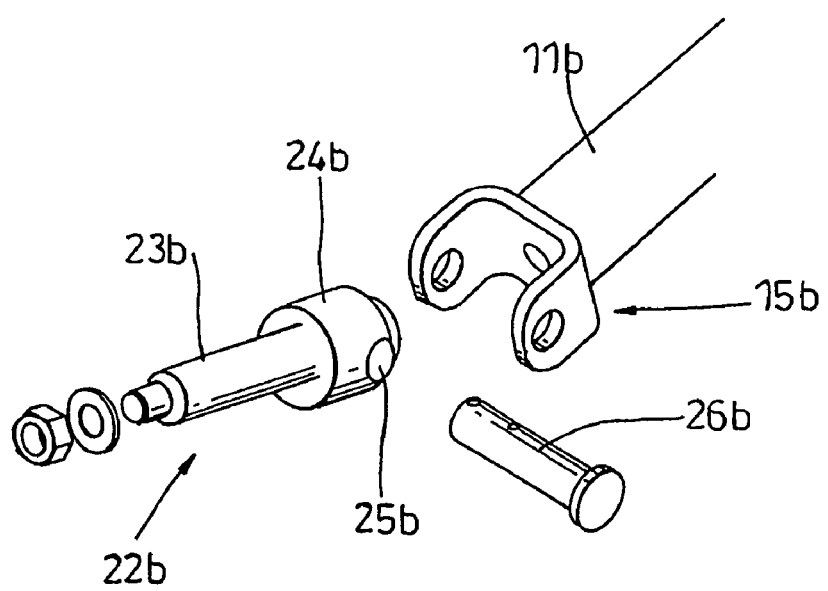
FIG. 4 is an enlarged schematic side view of the other end of the mounting arm of FIG. 2.

FIG. 4 shows a schematic view of the connection of the mounting arm 11b to the tail section 5 of the conveyor. The distal end of the lower section 11b of the mounting arm is provided with an articulated joint having at least two degrees of freedom. The lower section 11b of the mounting arm is mounted to the chassis through the swivel mounting shaft 22b of the lower articulated joint which is similar to the joint connecting the upper section of the mounting arm 11a to the head section 7. Mounting arm 11b can rotate with the swivel mounting shaft 22b around axis G shown in FIG. 2 and can pivot about the pivot mounting shaft 26b around axis H shown in FIG. 2.

A further rotational mounting shaft may be provided between the end of the mounting arm 11b and the C-shaped bracket 15b to allow for a further rotation of the mounting arm 11b with respect to the bracket 15b. This would provide the joint between the tail section and the mounting arm 11b with a third degree of freedom, which is acceptable but not necessary for carrying out the invention.

Figure 5:
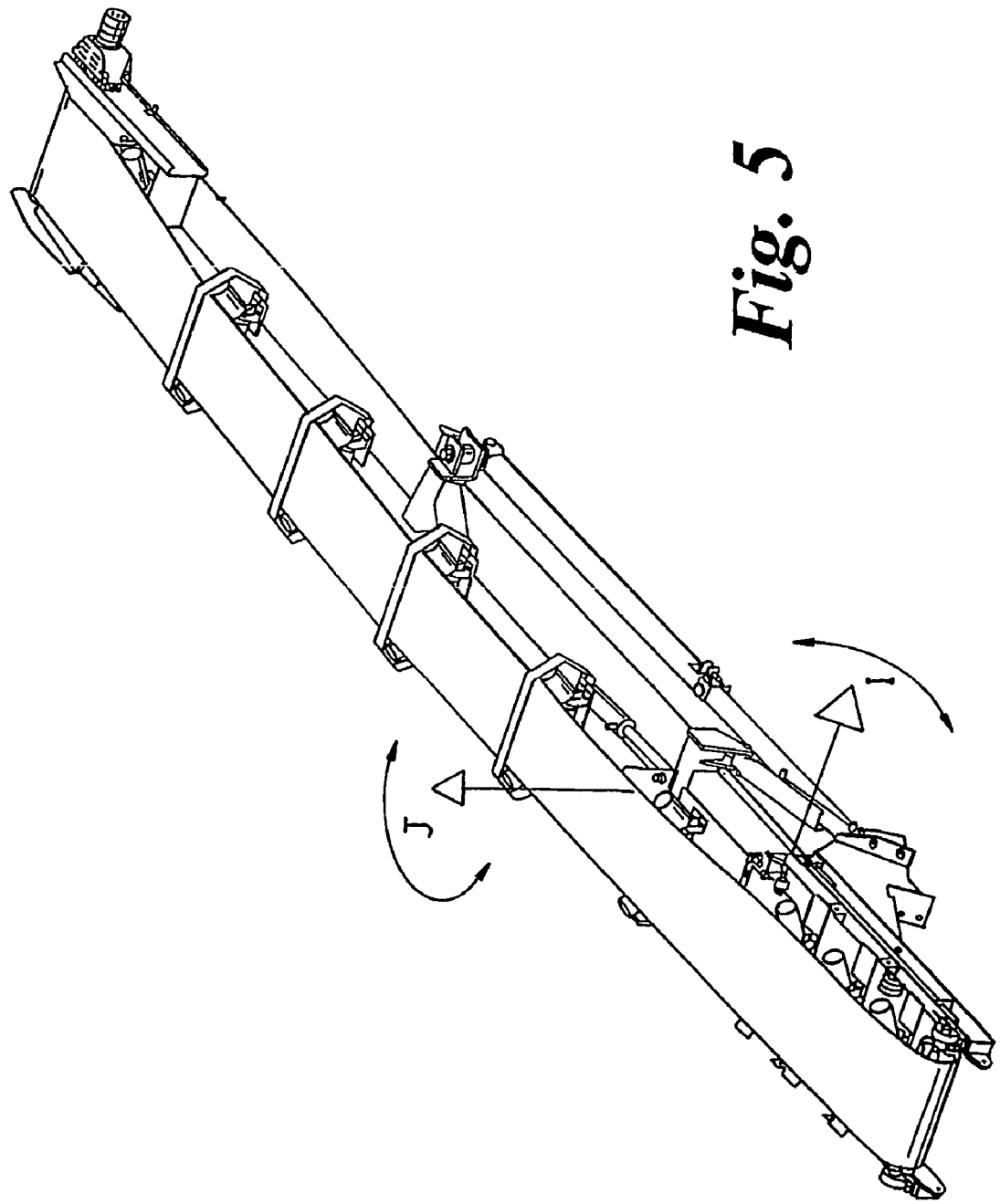
FIG. 5 is schematic view of the conveyor and support of FIG. 2 showing the folding axis of the conveyor.

Hydraulic cylinders 4 are mounted between the tail section 5 and the middle section 6 and the middle section 6 and the head section 7 of the lateral conveyors 3 for extending the conveyors between the operating and the stowed or transit positions. A first hydraulic cylinder 4a acts to extend the conveyor out from the chassis around axis I shown in FIG. 5, and a second hydraulic cylinder 4b is used to fold the head section of the conveyor back towards the chassis around axis J shown in FIG. 5 during transfer from the operating to the transit position as will be described in more detail below.

Figure 6:
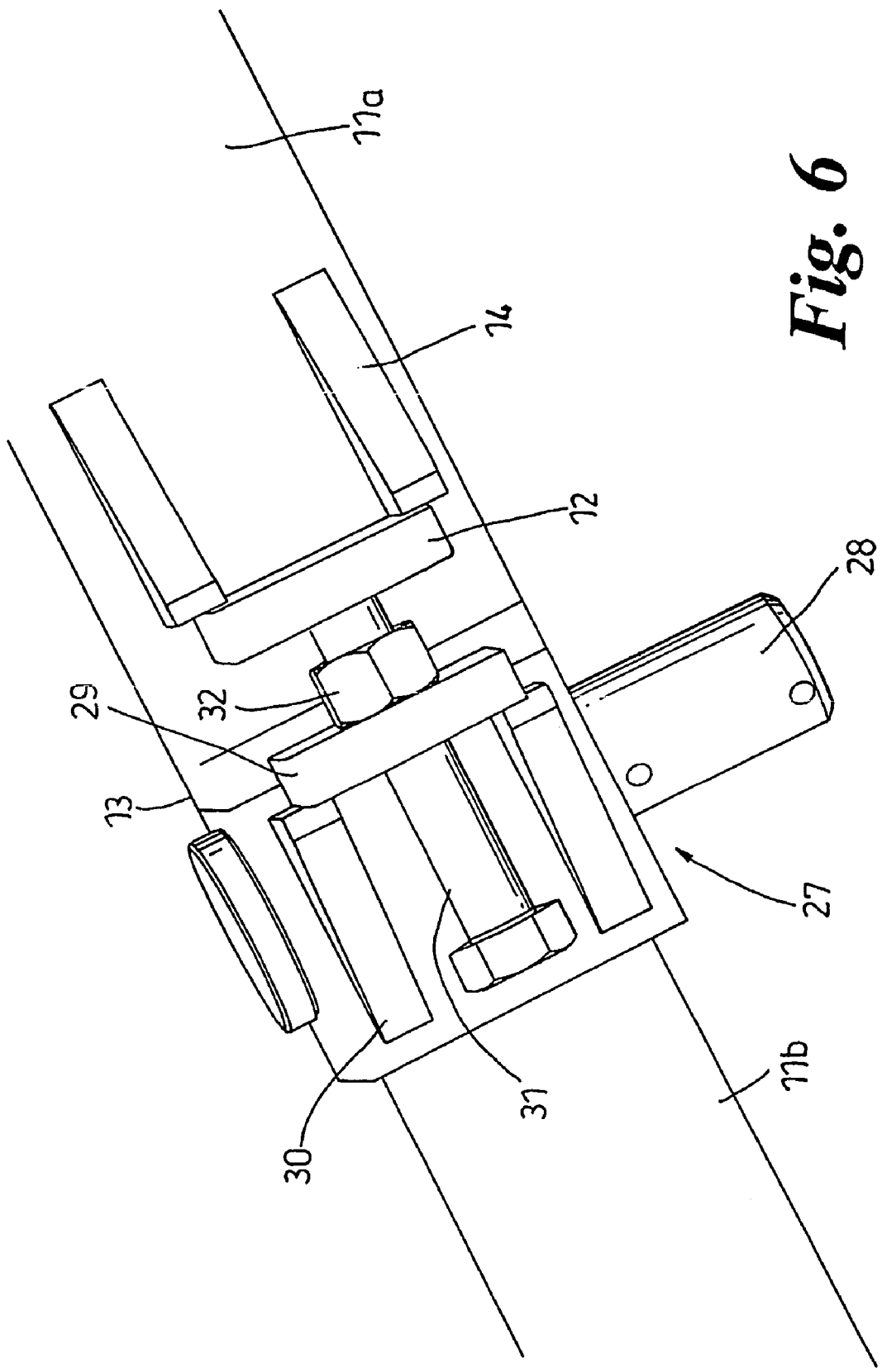
FIG. 6 is a schematic view of the collar locking the length of the mounting arm and the adjustment means provided thereon.

A collar 27 is provided between the free ends of the mounting arms 11a and 11b as shown in detail in FIG. 6. The collar is provided with apertures (not shown) which align with apertures 27' in the mounting 11b, one of which is shown in FIG. 2.

A pin 28 is provided through the apertures in the collar and the mounting arm 11b. The collar is provided with a lateral flange 29 of similar dimensions to the lateral flange 12 of the upper mounting arm section 11a and is also provided with triangular brackets 30 similar to the brackets 14 described above. The flange 29 is provided with threaded aperture (not shown) to receive a locking member 31 which is held in position by a threaded nut 32 or other suitable locking means. The collar surrounds the free end of mounting arm section 11b and is fixed thereto with pin 28. The free end of mounting arm section 11a rests on the collar as a result of gravity.

In use of the plant, during operation the lateral conveyors are supported on the chassis in an extended position.

In the event that the tracking of the belt upon the conveyor requires adjustment during use, the threaded nut 32 is loosened and the locking bolt 31 is turned either to increase or to decrease the distance between the flanges 12 and. 29 in order to provide fine adjustment of the length of the arm. It is an advantage of the present invention that adjustment of the tracking of the belt can occur during use of the conveyor 3 from a position remote from the head section of the conveyor as this does not require the head section of the conveyor to be lowered to the ground nor are personnel required to stand in the vicinity of the stock pile 8 under the head section 7 of the conveyor where injuries could occur from falling material or close to the running belt, which always creates a hazard of drawing-in.

When operation of the plant is completed and the chassis 2 is to be moved to a new location, the lateral conveyors 3 are moved from the operating position when they extend outboard of the chassis to a stored or transit position inboard of the chassis. Nut 32 and the locking bolt 31 are loosened and stopper pin 28 is removed from the apertures in the collar to allow the lower section of the mounting arm 11b to be telescopically received within the upper section of the mounting arm 11a. Hydraulic valves (not shown) are opened to operate the first hydraulic cylinder 4a to fold up the middle section of the conveyor 3 and the second hydraulic cylinder 4b to fold the head section 7 of the conveyor sidewards.

As the conveyor is lowered towards the ground the mounting arm 11 pivots around the pivot mounting shaft. As the head section is folded towards the middle of the conveyor, the mounting arm swivels on the swivel mounting shaft. During this operation, the length of the mounting arm telescopically alters and the collar and pin are used to lock the length of the mounting arm at the desired length. Furthermore, during this operation, the C-shaped member rotates on the rotational mounting shaft with respect to the mounting arm.

The conveyor may be extended through the first plane and then traversed through the second plane, or this order can be reversed, or alternatively, both movements may occur simultaneously.

Once the conveyor is in the transport position, it may be locked in this position by replacement of the pin 28. In the event that service or maintenance of the head section is required, the head section can be folded down without moving the conveyor into the transport position. As with the transport position, the head section may be locked in the service position by replacement of the stopper pin as described above.

A variable length support means having an articulated joint with 3 degrees of movement in one end and at least 2 degrees of movement in the other end as described above allows for a longer mounting arm to be used than was possible with prior art conveyors as the longer mounting arm of the present invention can still be accommodated within the dimensions of the chassis of the plant when the conveyor is in the transport position. As a longer mounting arm can be used, therefore a longer conveyor can be supported upon the chassis of the plant. Use of a longer conveyor enables a greater capacity of material to be processed during operation of the plant. Furthermore, the load on the conveyor is spread along a greater length of the conveyor frame and provides a more stable plant than was previously available which is not as susceptible to unfavorable working conditions such as soft or uneven ground of the worksite causing extensive vibration.

As described above, the tracking of the belt of the conveyor can be adjusted during operation. This is a significant advantage over prior art conveyors where the tracking is adjusted by altering the position of the belt on rollers within the head section of the conveyor which has to be done by lowering the head section to ground level. Such an operation could only take place during an interruption of the processing operation.

Whilst the present invention has been described as having a support member in the form of a mounting arm, it is envisaged that two such mounting arms will preferably be provided on the chassis to support a lateral conveyor.

Although the lateral conveyor has been described above as having three sections, a tail section, a middle section and a head section, it is envisaged that the head section of the conveyor can also be divided into separate subsections pivotable with respect to each other.

The embodiment provides a joint between mounting arm 11a and the head section 7 of the conveyor with three degrees of freedom and a joint between mounting arm 11b and the tail section 5 of the conveyor with two degrees of freedom. Within the scope of the claims, these two types of joints can replace each other. Also both joints can provide three degrees of freedom.

The embodiment provides a support extending between the head section 7 of the conveyor and the tail section 5 of the conveyor. Within the scope of the claims, the support can also extend between the head section 7 of the conveyor and the chassis 2, or any part of the plant firmly mounted on the chassis.

In addition, instead of hydraulic cylinder driving means other driving means may be used for example, hydraulic motors, pneumatic cylinders, pneumatic motors or electric motors with the necessary power transmission means. These driving means are preferably double acting for forward and backward movement.

Figure 7:
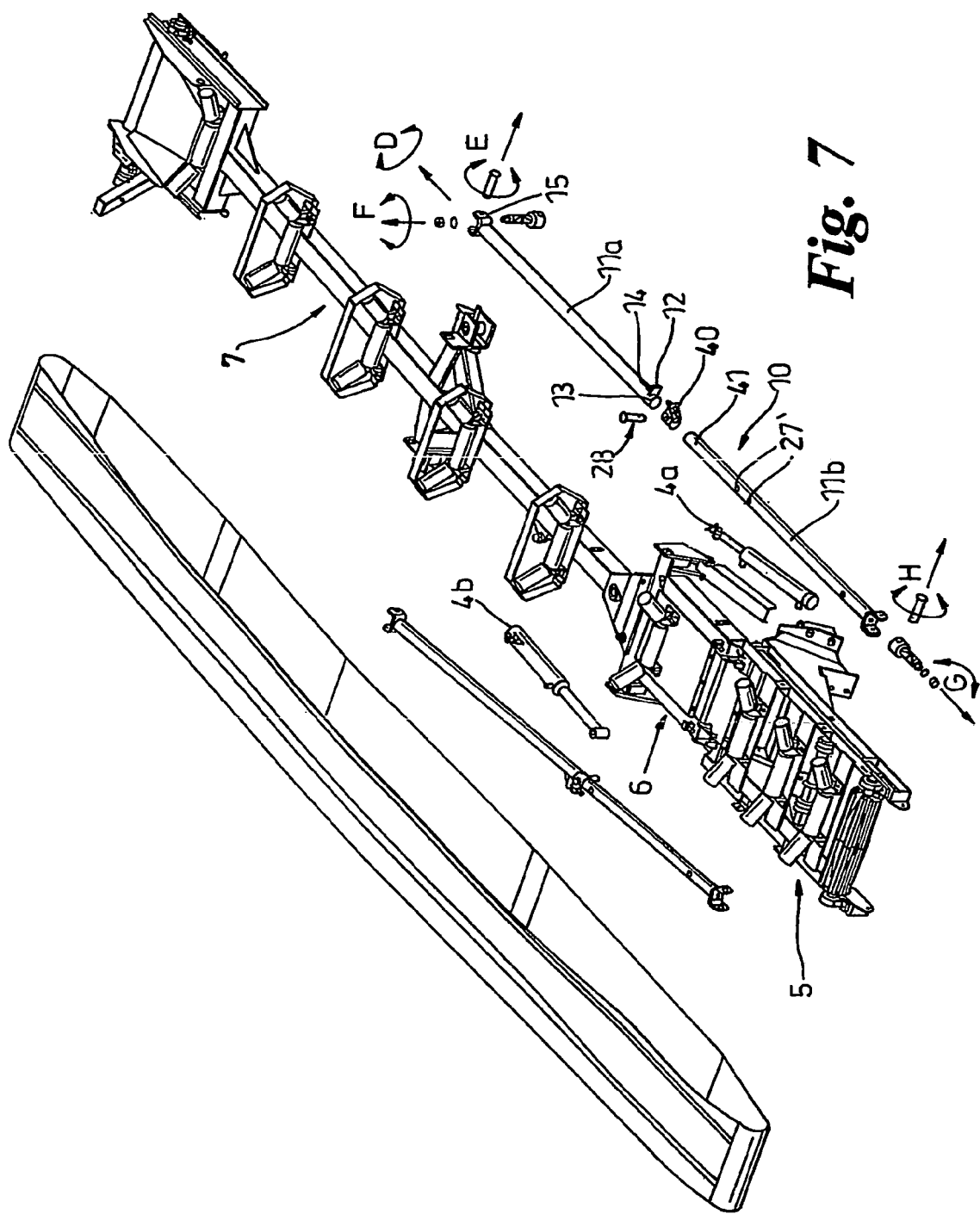
FIG. 7 is an exploded view of a lateral conveyor including a support means according to another embodiment of the present invention.
Figure 8:
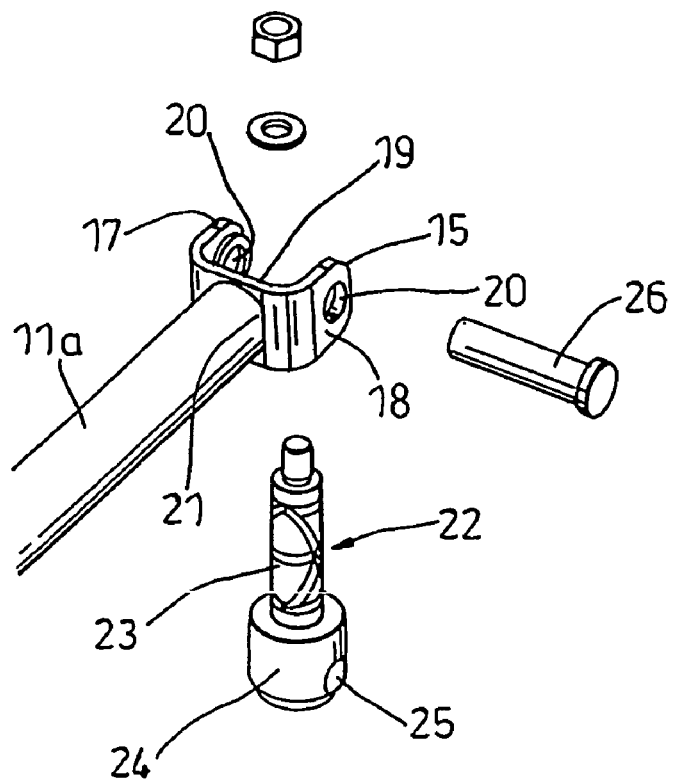
FIG. 8 is an enlarged schematic side view of one end of the section of the mounting arm shown in FIG. 7.
Figure 9:
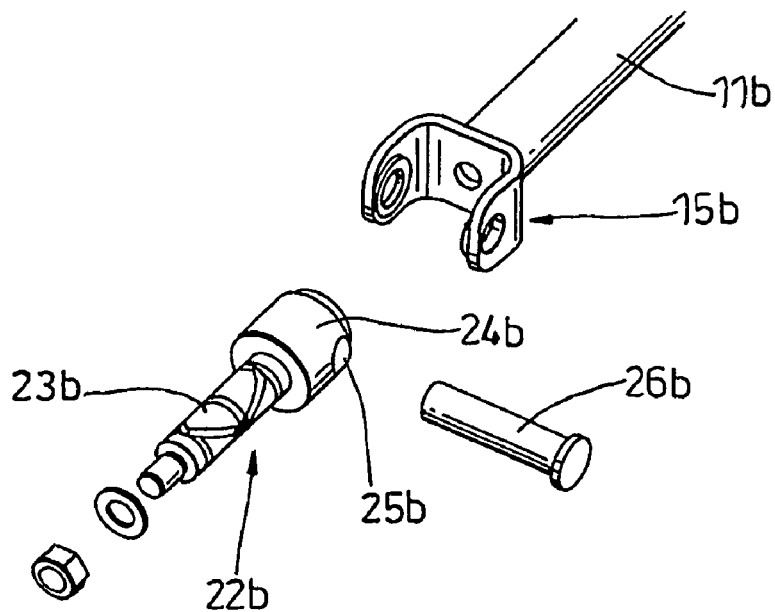
FIG. 9 is an enlarged schematic side view of the other end of the mounting arm of FIG. 7.

FIGS. 7 to 9 provide schematic views of a lateral conveyor including a support means according to another embodiment of the present invention. Most of the components of the embodiment of FIGS. 7 to 9 are the same as those of the embodiment of FIGS. 2 to 4 and thus reference should be made to the description given above with reference to FIGS. 2 to 4. Here, differences between the embodiment of FIGS. 2 to 4 and the embodiment of FIGS. 2 to 4 will be described.

FIG. 7 provides an exploded view of the lateral conveyor including the support means according to the other embodiment. This embodiment provides for two degrees of freedom of movement in the connection of the mounting arm 11a to the head section 7 of the conveyor instead of the three degrees of freedom of movement of the previous embodiment. The two degrees of freedom of movement are: elevation of the mounting arm 11a around axis E by allowing the bracket 15 to pivot around the shaft 26; and traversing of the mounting means around axis F by means of the swivel mounting shaft 22. FIG. 8 provides an enlarged schematic side view of the end of mounting arm 11a shown in FIG. 7. It is not required of this embodiment that the mounting arm 11a rotates around axis D. However, this embodiment may also be configured in the same way as the previous embodiment for rotation of the mounting arm 11a around axis D.

Turning to FIG. 9, it can be seen that mounting arm 11b is connected to the tail section 5 of the conveyer in the same way as the previous embodiment. The connection of FIG. 9 provides for two degrees of freedom of movement in common with the previous embodiment. In addition and in common with the previous embodiment, a further rotational mounting shaft may be provided between the end of the mounting arm 11b and the C-shaped bracket 15b to allow for a further rotation of the mounting arm 11b with respect to the bracket 15b. This provides the joint between the tail section and the mounting arm 11b with a third degree of freedom, which is acceptable but not necessary for carrying out the invention.

Returning now to FIG. 7, a collar 40 is provided between the free ends of the mounting arms 11a and 11b. Although the specific form of the collar 40 of this embodiment is different from the form of the collar 27 of the previous embodiment as described below, reference should be made to FIG. 6 for a description of the corresponding component parts of the collar 40. One of the two mounting arms 11a and 11b is received in the other and provides for telescopic variation of the length of the support means 10. As the co-locating ends 13 and 41 of the two mounting arms 11a and 11b are of substantially circular cross-section, the two mounting arms 11a and 11b are rotatable in relation to each other about axis D. The collar 40 is configured to cooperate with the circular cross sections of the ends of the two mounting arms 11a and 11b. This means that in this embodiment, two degrees of freedom of movement are provided by the connection between mounting arms 11a and 11b, whereas in the previous embodiment there is only one degree of freedom of movement, namely relative linear movement of the two mounting arms 11a and 11b.

Operation of the invention in accordance with this embodiment is the same as operation in accordance with the previous embodiment. Thus, the reader is referred to the description given above in relation to the operation of the previous embodiment.

In summary, in this embodiment the connection between the mounting arm 11a and the head section 7 provides for two degrees of freedom of movement and the connection between the two mounting arms 11a and 11b provides for two degrees of freedom of movement. In the previous embodiment, the connection between the mounting arm 11a and the head section 7 provides for three degrees of freedom of movement and the connection between the two mounting arms 11a and 11b provides for one degree of freedom of movement.

INDUSTRIAL APPLICABILITY

The support means of this invention finds use in the aggregate material processing industry.

The invention claimed is:

1. A support means for supporting a lateral conveyor adapted for mounting upon a mobile chassis,
    said conveyor comprising a tail section, middle section and at least one head section having pivot points related to the conveyor frame separating said sections from each other,
    said support means comprising a variable length mounting arm,
    said mounting arm comprising at least two sections and first and second ends, means for locking the length of the mounting arm into at least one fixed length corresponding to the length of the conveyor in a working position,
    the first end being fixed to said mobile chassis or a part fixed immobile in relation to said mobile chassis and the second end being fixed to the said head section of the conveyor or a part fixed immobile in relation to the at least one head section of the conveyor,
    the support means being configured to provide at least three kinematic pairs, in which a first kinematic pair is formed by a first section of the at least two sections of the mounting arm and the mobile chassis and is provided by a first joint, a second kinematic pair is formed by the first section and a second section of the at least two sections of the mounting arm, and the third kinematic pair is formed by the second section of the mounting arm and the at least one head section of the conveyor and is provided by a second joint,
    the support means being further configured such that the first kinematic pair provides for at least two degrees of freedom of movement, the second kinematic pair provides for at least one degree of freedom of movement, and the third kinematic pair provides for at least two degrees of freedom of movement, and at least one of said first, second and third kinematic pairs provides for an additional degree of freedom of movement.

2. The support means according to claim 1, in which the support means is configured such that the first kinematic pair provides for three degrees of freedom of movement and the third kinematic pair provides for two degrees of freedom of movement.

3. The support means according to claim 1, in which the support means is configured such that the first kinematic pair provides for two degrees of freedom of movement and the third kinematic pair provides for three degrees of freedom of movement.

4. The support means according to claim 1, in which the support means is configured such that both the first and third kinematic pairs provide for three degrees of freedom of movement.

5. The support means according to claim 1, in which the two degrees of freedom of movement of the first kinematic pair, the third kinematic pair or both first and third kinematic pairs are provided by the joint comprising a pivot mounting shaft and a swivel mounting shaft, whereby the mounting arm may be elevated in a one plane by pivoting upon the pivot mounting shaft and traversed in another plane by swivelling on the swivel mounting shaft.

6. The support means according to claim 1, in which the three degrees of freedom of movement of the first kinematic pair, the third kinematic pair or both first and third kinematic pairs are provided by the joint comprising a pivot mounting shaft, a swivel mounting shaft, and a rotational mounting shaft, whereby the mounting arm may be elevated in a first plane by pivoting upon the pivot mounting shaft and traversed in a second plane by swivelling on the swivel mounting shaft, and rotated about its longitudinal axis on the rotational mounting shaft.

7. The support means according to claim 6, in which the first and second planes are perpendicular.

8. The support means according to claim 7, in which the longitudinal axis of the second section is substantially parallel to a line of intersection of said planes.

9. The support means according to claim 6, in which a C-shaped bracket comprising a top face, a bottom face and a back plate extending between the top and bottom plates is mounted on at least one end of the mounting arm, through the rotational mounting shaft.

10. The support means according to claim 9, in which the top and bottom faces of the C-shaped bracket are substantially parallel and the back plate extends substantially perpendicularly to the top and bottom faces.

11. The support means according to claim 9, in which bearing means is provided between an end face of the mounting arm and the back plate of the bracket.

12. The support means according to claim 9, in which an aperture is provided in each of the top and bottom faces of the C-shaped bracket, said apertures being aligned along a common axis through the bracket.

13. The support means according to claim 9, in which the swivel mounting shaft is provided with a through bore and said swivel mounting shaft is mounted within the C-shaped bracket such that the bore is aligned with the apertures in the top and bottom face of the bracket.

14. The support means according to claim 13, in which the pivot mounting shaft extends though the apertures in the top and bottom faces of the C-shaped bracket and the bore of the swivel mounting shaft to lock the swivel mounting shaft in position within the bracket.

15. The support means according to claim 1 wherein the second kinematic pair has only one degree of freedom of movement.

16. The support means according to claim 15, in which the degree of freedom of movement of the second kinematic pair is provided by configuring the first and second sections for sliding in relation to each other.

17. The support means according to claim 15, in which the degree of freedom of movement of the second kinematic pair is provided by configuring the first and second sections for substantially linear movement in relation to each other.

18. The support means according to claim 17, in which the second section moves substantially in a direction of its longitudinal axis.

19. The support means according to claim 15, in which the mounting arm comprises three sections, in which the degree of freedom of movement of the second kinematic pair is provided between at least a first and second section and between the second and a third section.

20. The support means according to claim 1 wherein the second kinematic pair has two degrees of freedom of movement.

21. The support means according to claim 20, in which the two degrees of freedom of movement of the second kinematic pair is provided by configuring the first and second sections for rotation and sliding in relation to each other.

22. The support means according to claim 21, in which the second section is rotatable about its longitudinal axis and moved substantially in a direction of its longitudinal axis.

23. The support means according to claim 20, in which co-located portions of the first and second sections are of substantially circular cross-section.

24. The support means according claim 20, in which the mounting arm comprises three sections, in which a first degree of freedom of movement is provided between a first and second section and a second degree of freedom of movement is provided between the second and a third section.

25. The support means according to claim 24, in which the mounting arm is configured such that the first degree of freedom of movement is sliding of the first and second sections in relation to each other and the second degree of freedom of movement is rotation of the second and third sections in relation to each other.

26. The support means according to claim 25, in which the mounting arm is configured such that the first degree of freedom of movement is rotation of the first and second sections in relation to each other and the second degree of freedom of movement is sliding of the second and third sections in relation to each other.

27. The support means according to claim 1, in which one of the first and second sections is located within the other to allow for telescopic length adjustment of the mounting arm.

28. The support means according to claim 27, in which the mounting arm comprises a hydraulic cylinder.

29. The support means according to claim 1, in which the support means further comprises means for locking the length of the variable length mounting arm into a fixed length corresponding to the length of the conveyor in a transport position and/or service position.

30. The support means according to claim 1, in which the head section of the conveyor consists of at least two separate sections pivotable to each other, the first of the said head sections being supported to said mobile chassis or a part fixed immobile in relation to said mobile chassis with said variable length arm.

31. The support means according to claim 1, in which one end of the mounting arm is connected to a tail section of the conveyor and the other end of the mounting arm is connected to a head section of the conveyor.

32. The support means according to claim 1, in which a collar and a locking pin is provided to fix the length of the support to correspond to the working position of the conveyor.

33. The support means according to claim 32, in which said collar and locking pin are further operable to fix the length of the support to correspond to a transport position and to a maintenance position of the conveyer.

34. The support means according to claim 1, in which bearing means is provided between gliding surfaces of the support means.

35. The support means according to claim 1, in which the mounting arm comprises a box section formed of metal or any suitable material.

36. The support means according to claim 35, in which the box section is at least one of extruded, cast and cut from hollow or open section in required lengths.

37. The support means according to claim 1, in which the support means is formed of mild steel.

38. A mobile chassis comprising a lateral conveyor mounted thereon and a support means for supporting a lateral conveyor according to claim 1.

39. The mobile chassis according to claim 38, in which the mobile chassis is a mobile aggregate processing plant.

40. A support means according to claim 1, wherein adjustment means are provided to finely alter the length of the mounting arm when locked into the at least one fixed length.

* * * * *